(12) United States Patent
Wu et al.

(10) Patent No.: US 7,386,686 B2
(45) Date of Patent: Jun. 10, 2008

(54) INLINING WITH STACK TRACE CACHE-BASED DYNAMIC PROFILING

(75) Inventors: Gansha Wu, Beijing (CN); Guei-Yuan Lueh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 500 days.

(21) Appl. No.: 10/402,520

(22) Filed: Mar. 28, 2003

(65) Prior Publication Data

US 2004/0205409 A1    Oct. 14, 2004

(51) Int. Cl.
*G06F 12/00*    (2006.01)

(52) U.S. Cl. .............. 711/147; 712/227; 717/128; 717/162

(58) Field of Classification Search .............. 711/130, 711/147, 148, 152, 154, 157, 165, 170, 203, 711/209; 717/124, 125, 126, 127, 130, 131
See application file for complete search history.

(56) References Cited

U.S. PATENT DOCUMENTS

| | | | |
|---|---|---|---|
| 5,740,443 A | 4/1998 | Carini | 717/133 |
| 5,815,719 A | 9/1998 | Goebel | 717/158 |
| 5,950,003 A * | 9/1999 | Kaneshiro et al. | 717/130 |
| 5,978,586 A | 11/1999 | Baisley et al. | 717/158 |
| 5,978,587 A | 11/1999 | Baisley et al. | 717/144 |
| 6,072,951 A | 6/2000 | Donovan et al. | 717/158 |
| 6,106,574 A | 8/2000 | Baisley et al. | 717/140 |
| 6,119,206 A * | 9/2000 | Tatkar et al. | 711/147 |
| 6,161,217 A | 12/2000 | Detlefs et al. | 717/141 |
| 6,175,948 B1 | 1/2001 | Miller et al. | 711/7 |
| 6,195,793 B1 | 2/2001 | Schmidt | 717/151 |
| 6,223,340 B1 | 4/2001 | Detlefs | 717/145 |
| 6,317,796 B1 | 11/2001 | Bak et al. | 719/315 |
| 6,363,521 B1 | 3/2002 | Yasue et al. | 717/128 |
| 6,367,071 B1 | 4/2002 | Cao et al. | 717/160 |
| 6,505,344 B1 | 1/2003 | Blais et al. | 717/151 |
| 6,513,155 B1 * | 1/2003 | Alexander et al. | 717/124 |
| 6,658,653 B1 * | 12/2003 | Bates et al. | 717/131 |
| 6,779,180 B1 * | 8/2004 | Palm | 718/100 |
| 2004/0163077 A1 * | 8/2004 | Dimpsey et al. | 717/130 |

\* cited by examiner

*Primary Examiner*—Donald Sparks
*Assistant Examiner*—Matthew Bradley
(74) *Attorney, Agent, or Firm*—Blakely, Sokoloff, Taylor & Zafman LLP (57) ABSTRACT

A method and system are provided for improving inlining using stack trace cache-based dynamic profiling. In one embodiment, a relationship map is provided to map a key representing a caller-callee relationship with a corresponding value indicating a frequency of call site executions. Whether a last stack frame of a stack frame trace is cached is determined. A caller-callee relationship is recorded if the last stack frame is not cached, wherein the caller-callee relationship is recorded in the relationship map, and the relationship map is updated with the recorded caller-callee relationship and then monitored via a recompilation scheduler, the monitoring to determine when a compilation or recompilation of callers and callees is to be performed. A turning on or turning off of dynamic profiling is conducted to perform partial unwinding of the frames in the stack trace.

15 Claims, 5 Drawing Sheets

INLINING WITH STACK TRACE CACHE-BASED DYNAMIC PROFILING

BACKGROUND OF THE INVENTION

1. Field of the Invention

This invention relates to software applications and in particular, to improving inlining using stack trace cache-based dynamic profiling.

2. Description of the Related Art

Many modern software languages, such as Java, C#, and C++ use procedures and functions, also called methods, to act as a semantic abstraction boundary, so that the programs may be divided into different units for easier maintenance and development. Object Oriented languages, such as Java, C#, and C++, provide a programming way in which procedure calls are frequent and procedure sizes are small. The method might be the encapsulation of one functionality, and it can be overridden with a new implementation, resulting in the explosion of call sites and leads to performance penalties. Stated differently, writing modular programs causes penalties, and one way to reduce such penalties is by procedure integration, also called inlining. Inlining is a well-known compile-time optimization technique to improve the execution performance of programs by replacing or duplicating a procedure call with the body of the called procedure.

Many attempts have been made to improve inlining, particularly with regard to Just-In-Time (JIT) compilers in order to get more run time benefits. For example, inlining plays an important factor in JIT complied (JITted) code performance, which is widespread with regard to overall performance of desktop and server/enterprise workloads. JITted code refers to the code generated on the fly by a JIT compiler. Although inlining is a well known technique to improve the execution performance of statically compiled software applications, the methods and systems available today do not efficiently reduce runtime overhead, or minimize unwinding overhead by using stack trace cache, or improve processor performance, particularly with regard to JITted code.

One of the methods available today is instrument profiling, i.e., to add instrumentation code, such as some profiling code, at the entry of methods to collect call site information, such as counter, and caller-callee relationship. However, with instrument profiling, the original code is polluted and performance is degraded, because of the extra/foreign code being added to the original code. Furthermore, instrument profiling is often used only with base line compilers.

Another method for improving inlining available today is sample profiling. Typically, sample profiling uses some kind for a meter or other hardware-assisted monitoring methods to sample instruction pointers and insert the instruction pointers into a database to find which instruction pointer belongs to which corresponding method to determine which method is hot. Whether a method is hot may depend on the frequency of a caller invoking its callee, and a large enough frequency may classify the method as hot. However, sample profiling is limited only to determining hot methods, but cannot find the specific caller-callee pair that is hot as there may be many callers calling the hot method.

Methods, systems, and techniques available today are obtrusive and/or do not provide accurate and efficient inlining as they fail to determine hot caller-callee relationships. Furthermore, the methods, systems, and techniques available today do not efficiently reduce runtime overhead, minimize unwinding overhead, or improve processor performance.

BRIEF DESCRIPTION OF THE DRAWINGS

The appended claims set forth the features of the present invention with particularity. The embodiments of the present invention, together with its advantages, may be best understood from the following detailed description taken in conjunction with the accompanying drawings of which:

DETAILED DESCRIPTION

A method, system, and apparatus are described for improving inlining with stack trace cache-based dynamic profiling. Broadly stated, embodiments of the present invention provide inlining hints and enhanced profiling performance.

A system, apparatus, and method are provided for periodically monitoring and tracking instruction pointers for sample profiling and stack unwinding for determining hot caller-callee relationships and the corresponding caller/callee pairs. According to one embodiment, stack unwinding, also referred to as stack crawling or stack walking, may refer to the process of iterating from frame to frame, for example, from top to bottom, of a stack trace. Stack unwinding may be referred to as the process of obtaining stack trace information. The stack trace information may include a list of stack frames, context information relating to each of the stack frames, current instruction pointer, source line number information, and stack pointer. Stack trace may refer to a chain of stack frames with each of the stack frames representing the state of a call to some function. The frames in the stack trace, for example, from bottom to top, may represent the caller-to-callee relationships. According to one embodiment, as several frames may remain unchanged in a stack trace, reduced unwinding may be provided to avoid performing the full stack unwinding when filling stack trace, resulting in a lightweight inlining.

According to one embodiment, a relationship map may be provided to map the key representing a caller/callee relationship with a corresponding value indicating the frequency of call site executions, i.e., how often the call was made or executed. The relationship map may be provided further to record hot caller-callee relationships. According to one embodiment, a method lookup table is provided to maintain starting and ending addresses of each of the methods, and to trace and track caller-callee pairs corresponding to hot caller-callee relationships.

According to one embodiment, a system, apparatus, and method are provided for a lightweight profiler using stack trace cache to minimize unwinding costs. According to one embodiment, first-hand information may be collected and analyzed in batches during central processing unit (CPU) idle cycles, making it applicable with optimizing compilers. According to one embodiment, a recompilation scheduler may be provided to periodically track the relationship map to determine hot caller-callee pairs and to recompile callers and inline callees, as necessary. The recompilation scheduler may be used to the turn dynamic profiling on and off based on a predetermined policy or criteria.

According to one embodiment, dynamic profiling may be based on stack trace cache to improve inlining to improve performance of software applications, implementations of software applications, and programming system research. According to one embodiment, for example, by not unwinding all of the frames in a stack trace cache, runtime overhead for stack unwinding may be minimized. Dynamic profiling based on stack trace cache may help reduce runtime overhead and help improve machine and/or processor performance. Many other advantages of the embodiments will be mentioned or discussed here or they will be apparent to one skilled in the art, based on the disclosure provided herein.

In the following description, for the purposes of explanation, numerous specific details are set forth in order to provide a thorough understanding of the present invention. It will be apparent, however, to one skilled in the art that the embodiments of the present invention may be practiced without some of these specific details. In other instances, well-known structures and devices are shown in block diagram form.

The embodiments of the present invention include various steps, which will be described below. The steps may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The embodiments of the present invention may be provided as a computer program product that may include a machine-readable medium, having stored thereon instructions which may be used to program a computer (or other electronic devices) to perform a process according to the present invention. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, a carrier wave or other propagation medium shall be regarded as comprising a machine-readable medium for the purpose of the present specification.

Figure 1:
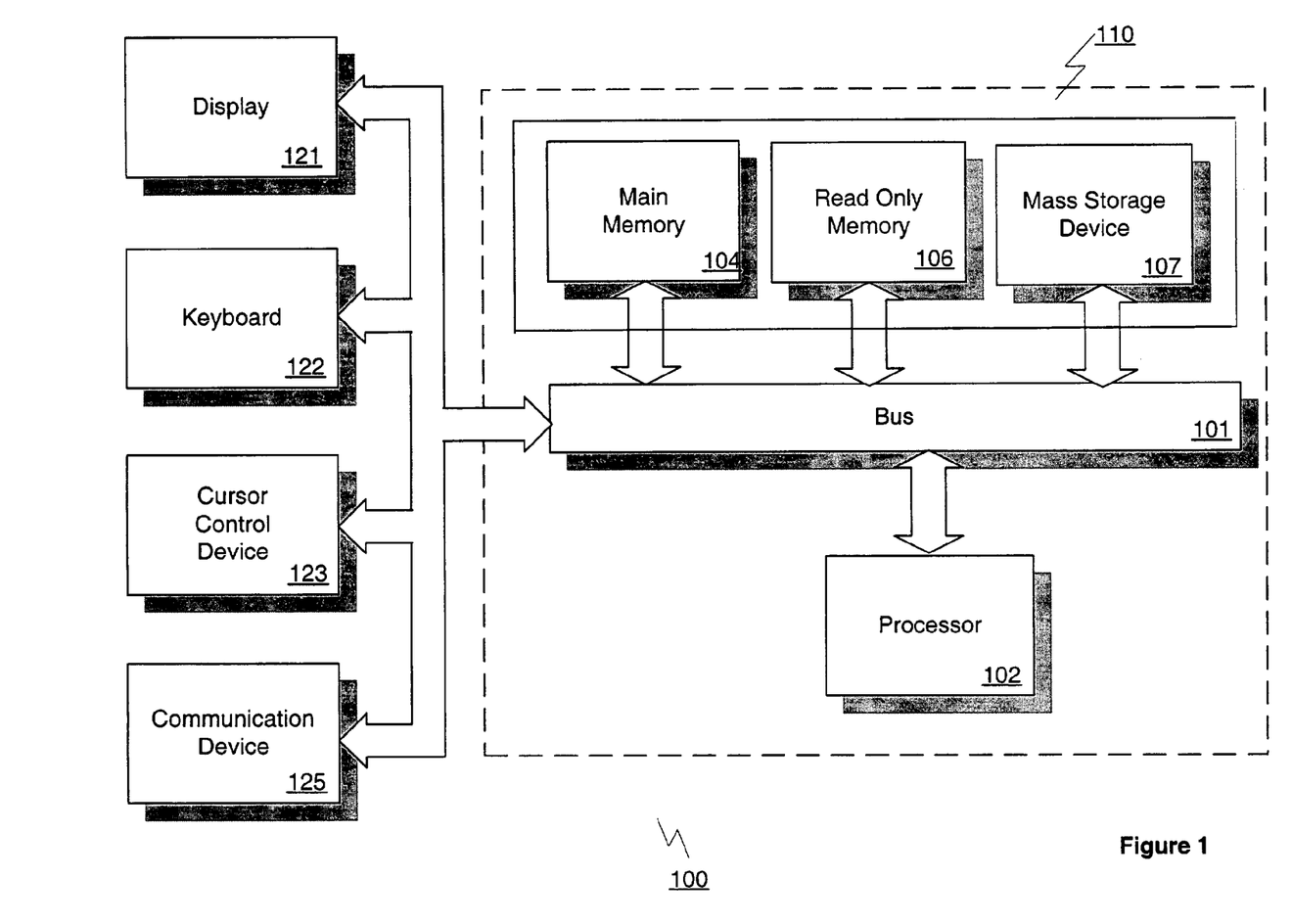
FIG. 1 is a block diagram of a typical computer system upon which one embodiment of the present invention may be implemented.

FIG. 1 is a block diagram of a typical computer system upon which one embodiment of the present invention may be implemented. Computer system 100 includes a bus or other communication means 101 for communicating information, and a processing means such as processor 102 coupled with bus 101 for processing information. Computer system 100 further includes a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also includes a read only memory (ROM) and/or other static storage device 106 coupled to bus 101 for storing static information and instructions for processor 102.

A data storage device 107 such as a magnetic disk or optical disc and its corresponding drive may also be coupled to computer system 100 for storing information and instructions. Computer system 100 can also be coupled via bus 101 to a display device 121, such as a cathode ray tube (CRT) or Liquid Crystal Display (LCD), for displaying information to an end user. Typically, an alphanumeric input device 122, including alphanumeric and other keys, may be coupled to bus 101 for communicating information and/or command selections to processor 102. Another type of user input device is cursor control 123, such as a mouse, a trackball, or cursor direction keys for communicating direction information and command selections to processor 102 and for controlling cursor movement on display 121.

A communication device 125 is also coupled to bus 101. The communication device 125 may include a modem, a network interface card, or other well-known interface devices, such as those used for coupling to Ethernet, token ring, or other types of physical attachment for purposes of providing a communication link to support a local or wide area network, for example. In this manner, the computer system 100 may be coupled to a number of clients and/or servers via a conventional network infrastructure, such as a company's Intranet and/or the Internet, for example.

It is appreciated that a lesser or more equipped computer system than the example described above may be desirable for certain implementations. Therefore, the configuration of computer system 100 will vary from implementation to implementation depending upon numerous factors, such as price constraints, performance requirements, technological improvements, and/or other circumstances.

It should be noted that, while the steps described herein may be performed under the control of a programmed processor, such as processor 102, in alternative embodiments, the steps may be fully or partially implemented by any programmable or hard-coded logic, such as Field Programmable Gate Arrays (FPGAs), transistor-transistor logic (TTL) logic, or Application Specific Integrated Circuits (ASICs), for example. Additionally, the method of the present invention may be performed by any combination of programmed general-purpose computer components and/or custom hardware components. Therefore, nothing disclosed herein should be construed as limiting the present invention to a particular embodiment wherein the recited steps are performed by a specific combination of hardware components.

Figure 2:
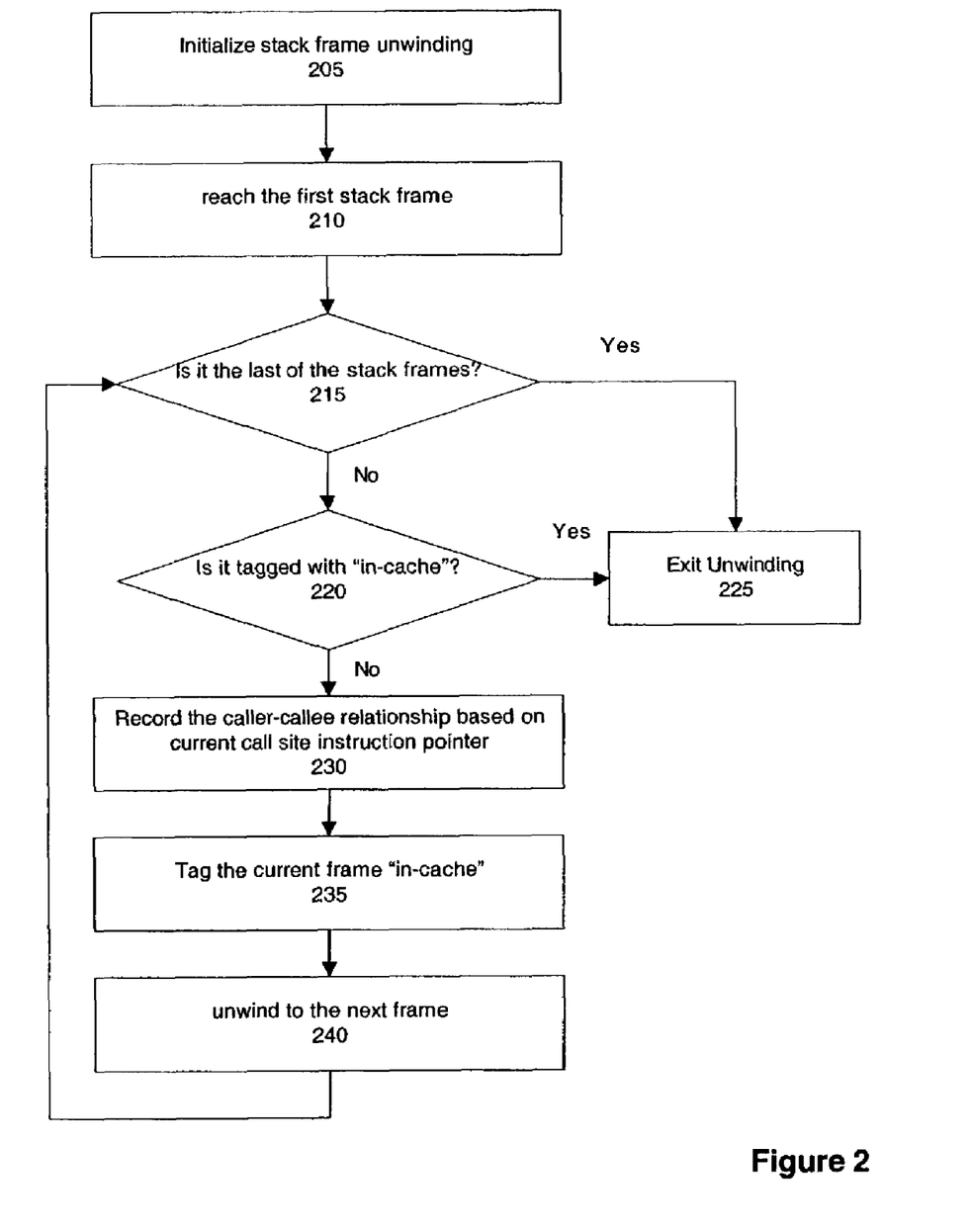
FIG. 2 is a flow diagram conceptually illustrating dynamic profiling, according to one embodiment.

FIG. 2 is a flow diagram conceptually illustrating dynamic profiling, according to one embodiment. According to one embodiment, for each new call that is invoked, a stack frame may be generated or constructed to hold necessary information for that particular call. According to one embodiment, a compiler, such as a Just-In-Time (JIT) compiler, may be used to tag a stack frame as "not cached" or "in cache". Other examples of compilers include Java Virtual Machine, Java compiler, Java chip, and such. Any of the above-mentioned compilers or other compilers may be used depending on various factors and necessities. Once a stack frame is generated, the compiler may tag it as "not cached". According to one embodiment, with the continuing of the program, the stack of stack frames may keep growing with a series of active frames. At some point, a sample handler may be activated and unwinding interations of those "not cached" frames may be invoked.

First, as illustrated, stack frame unwinding is initialized at processing block 205. The stack frame trace may be initialized with a default value. At processing block 210, the first/top stack frame is reached using sampled instruction pointers. At decision block 215, whether the current frame is the bottom of the stack frames, e.g., the last frame of the stack frames, is reached is determined. If the last frame of the stack frames has been reached, unwinding is exited at processing block 225. If the last frame of the stack frames has not been reached, the current frame may be checked further to determine whether it is "in cache" at processing block 220.

According to one embodiment, if the frame is determined to be "in cache", the unwinding is exited at processing block 225. An "in cache" frame may mean that all stack frames to come or frames forward are in cache. In other words, the frames have not been popped since the last sampling, and the unwinding is exited. Terms "not cached" and "in cache" may be synonymous with terms "active" and "inactive", respectively. According to one embodiment, a frame may be a Java frame or Microsoft. Net frame, or such.

According to one embodiment, if the frame is determined to be "not cached", the caller-callee relationship is recorded at processing block 230. According to one embodiment, the caller-callee relationship may be recorded in accordance with the current call site instruction pointer (callsite_ip), which is the current frame instruction pointer (frame_ip). According to one embodiment, the recording of a caller-callee relationship may be as simple as updating an entry in a relationship map. At processing block 235, the frame is tagged as "in cache", which represents that the frame has been unwound.

At processing block 240, the unwinding of the frames continues to the next frame, and, at decision block 215, whether the last frame of the stack frames has been reached is determined. According to one embodiment, the iteration count of unwinding may depend on the sampling frequency, such as, if the sampling interval is longer, there may be more "not cached" frames. Furthermore, the sampling, according to one embodiment, may be lightweight, which may be, partly in reference or due to the rapid implementation of record relationship.

According to one embodiment, the relationship map may be a hashtable mapping call site to count (callsite->count). In other words, call site may be the key representing a caller/callee relationship and count may represent the value indicating the number of times the call site has been executed, i.e., the frequency of a particular caller invoking its callee. According to one embodiment, if the count is large, it represents that a caller-callee relationship is hot. The count size and the hotness of the relationship may be directly proportional to each other, as the greater the count size the hotter the caller-callee relationship might be. Furthermore, the relationship map may be implemented as a hashtable not only to facilitate fast access, but also to define how to access a value (count) according to the key (call site) depending on the hash algorithm of the hashtable implementation. The "map[key]" denotation may represent access to the value mapped to the key.

According to one embodiment, call site instruction pointer (callsite_ip) may be enough to hold the information about the caller and callee. For each method, the compiler may have and maintain a list of call site information (e.g., callsite_ip, callee), which may mean that at callsite_ip, a callee is called. Furthermore, each call site may be mapped to a call site instruction pointer.

According to one embodiment, a call site may mean that at this point in time, a caller is calling a callee. Stated differently, a caller may be traced or found using the call site instruction pointer, according to one embodiment, for example, using the method lookup table (caller=method_lookup_table.find(callsite_ip); callee=caller.get_callee (callsite_ip)). According to one embodiment, call site instruction pointer may represent a code address, and which method contains a particular code address. For example, which method is the caller, may be found using the method lookup table. Furthermore, a caller may maintain a list of call site information, so that the caller may find the callee using the call site instruction pointer, and as such, a caller-callee relationship is constructed.

According to one embodiment, method lookup table may be a data structure to save the starting and ending addresses of each of the methods after the compiler generates its code. Stated differently, for each of the methods there may be an entry in the method lookup table having the starting and ending addresses of each of those methods. Given a code address, the runtime may find the method containing that particular address using the method lookup table. According to one embodiment, the method lookup table may be useful in performing instruction pointer sampling and stack unwinding, using return address to find a caller. The method lookup table data structure may be a container that eases the lookup. For example, the data structure can be as simple as a linear sorted array with element type as tuple (start_address, end_address), and one may perform lookup in them using a well-known binary search method lookup table. According to one embodiment, along with recording and sampling of instruction pointers, stack unwinding to record caller-callee relationship may be performed.

According to one embodiment, extra or foreign code may not be added to the original code. Such advantage provides for a less obtrusive method for performing inlining as it may not pollute the original code or add instrumentation time into running code resulting in changing of the program behavior. According to one embodiment, caller-callee relationships are determined using sample profiling of periodically tracking instruction pointers of an application thread through non-destructive unwinding. According to one embodiment, sampling may be performed using hardware performance counters, user level timers, or such. The frequency of sampling may be predefined using various factors, such as lower performance, sampling accuracy, and such, or a combination thereof.

Furthermore, the profiler, according to one embodiment, may use stack trace cache to reduce the unwinding cost, making the profiler relatively lightweight. The unwinding cost may be reduced, according to one embodiment, by collecting first-hand information and performing analysis in batches during the central processing unit (CPU) idle cycles. The dynamic profiling may be turned on or off based on a predetermined policy or criteria. The lightweight profiling may qualify the profile in optimizing compilers.

According to one embodiment, the profiler may be based on or used for sample profiling, but also based on or used for instrumentation profiling. The sampling, according to one embodiment, may include periodically monitoring instruction pointers of running application threads. The frequency may be controllable based on a trade-off between performance degradation and sampling accuracy. Stated differently, how often or how long the profiling may continue may depend on the performance and/or accuracy of the sample. Sample profiling, according to one embodiment, may be triggered using hardware performance counters, such as Vtune, system timer interrupt, user level timer, or such.

According to one embodiment, stack unwinding for recording caller-callee relationships may be performed during exceptions, garbage collection (GC) enumeration, and security checks on the stack. However, unwinding, according to one embodiment, may be lightweight, which may refer to needing only to find "not cached" stack frames, i.e., only those stack frames are of interest that popped and were pushed back and forth. Furthermore, according to one embodiment, only methods corresponding to "not cached" stack frames may be considered hot, and ones staying at the bottom of the stack frames, for example, main ( ), may not be candidates for recompilation. Stack unwinding, according to one embodiment, may necessitate only a partial unwinding by not requiring a full stack unwinding, as several of the stack frames may remain unchanged, resulting in a relatively lightweight unwinding.

According to one embodiment, inlining may occur on a high language level by some explicit hint, as with C++, and may also be enforced by compilers. A compiler, according to one embodiment, may have its inlining heuristic defined in the inline policy, and a static compiler may also use static profiling information to perform more aggressive and accurate inlining. With regard to a JIT compiler, an aggressive policy for inlining methods may not be employed, and inlining heuristic may mostly be static and simple. For example, inlining only those methods with code size smaller than some threshold, and for just in time property, JIT compilers may not have static profiling to instruct inlining. Inlining, according to one embodiment, may be used on JIT compiled (JITted) code performance for an overall performance of desktop and server/enterprise workloads.

Figure 3:
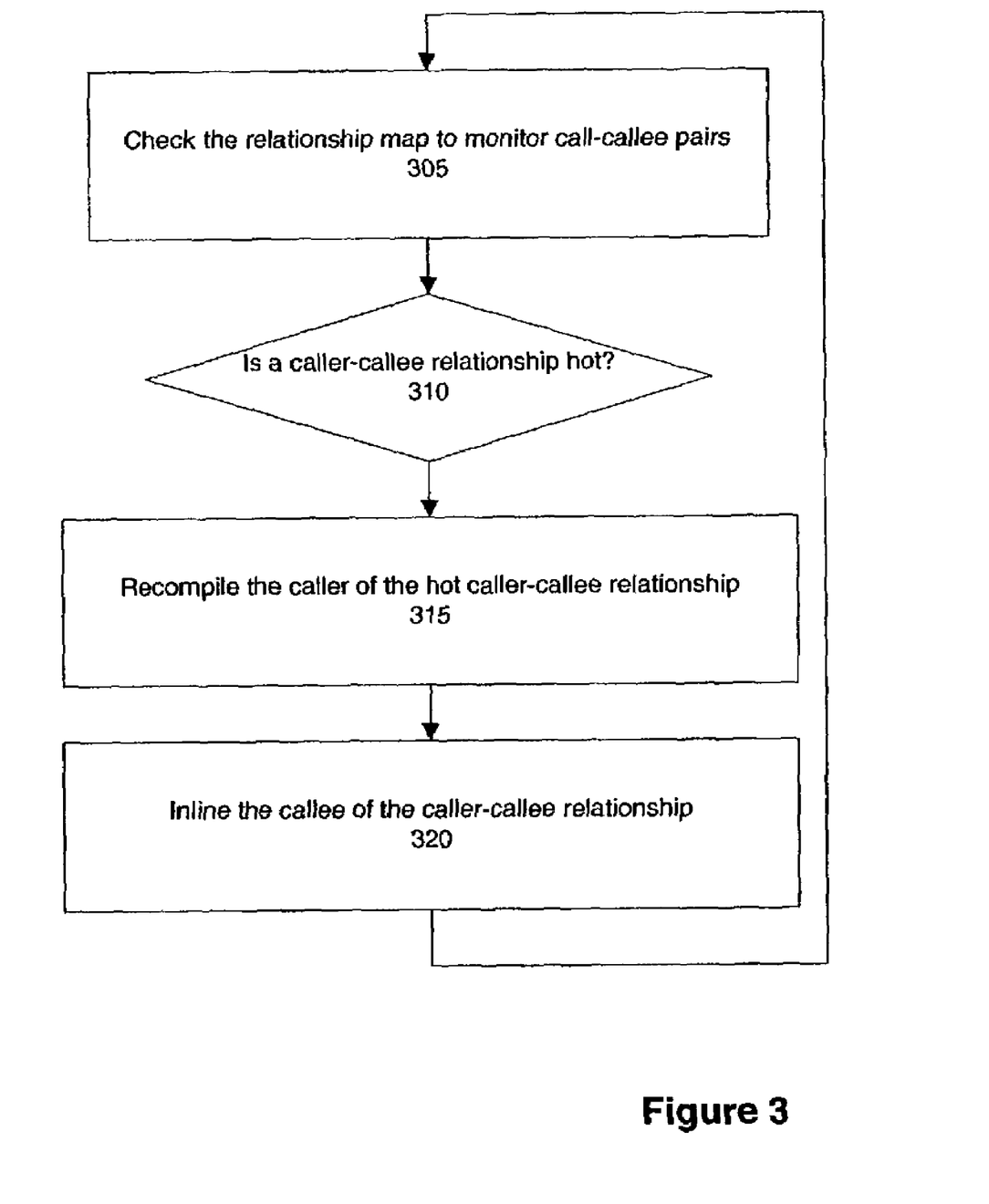
FIG. 3 is a flow diagram conceptually illustrating a working recompilation scheduler, according to one embodiment.

FIG. 3 is a flow diagram conceptually illustrating a working recompilation scheduler, according to one embodiment. A recompilation scheduler, working in idle priority, may, according to one embodiment, periodically check the relationship map in order to monitor caller-callee pairs or relationships to seek the caller-callee pairs or relationships that may be hot at processing block 305. A hot caller-callee pair or relationship, which is directly proportional to count, may indicate a large count. At decision block 310, the recompilation scheduler determines whether the caller-callee pair is hot, i.e., whether the count is large enough for a caller-callee pair to be considered hot. According to one embodiment, whether the count is large enough, i.e., whether a caller-callee pair is hot enough may depend on a hotness threshold or multiple hotness thresholds depending on various factors, such as a policy or criteria. A hot caller-callee pair may the one corresponding to a recorded caller-callee relationship; or, in other words, a caller-callee pair corresponding to a recorded caller-callee relationship may be considered hot.

If a caller-callee pair is determined to be hot, the caller of the hot caller-callee pair, if worthy of recompiling, may be recompiled at processing block 315. At processing block 320, the callee of the hot caller-callee pair, i.e., the callee corresponding to the recompiled caller, may be inlined. According to one embodiment, the recompilation scheduler may infer from the instruction pointer to a method handle by searching the method lookup table, which may store the starting and ending instruction pointer for each of the methods handle. If a caller-callee pair is not determined to be hot, the recompilation scheduler may continue the monitoring of caller-callee pairs at processing block 305.

According to one embodiment, the recompilation scheduler may perform an even more aggressive inlining hints if it finds several caller-callee pairs that can be concatenated, and they have similar sampling counts, i.e., they have similar hotness. For example, A calls B, B calls C, and the two pairs are found exceeding a certain amount of hotness threshold, the recompilation scheduler, in that case, may issue a recompiling request with hints of inlining both B and C in A, i.e., recompile A to inline B and C.

Furthermore, according to one embodiment, the recompilation scheduler may turn on and off dynamic profiling automatically based on some predetermined policy, criteria, or such, or a combination thereof. Some examples of such policy or criteria might be the length of time spent on dynamic profiling, number of samples collected, number of recompilation requests issued, or such, or a combination thereof.

Figure 4:
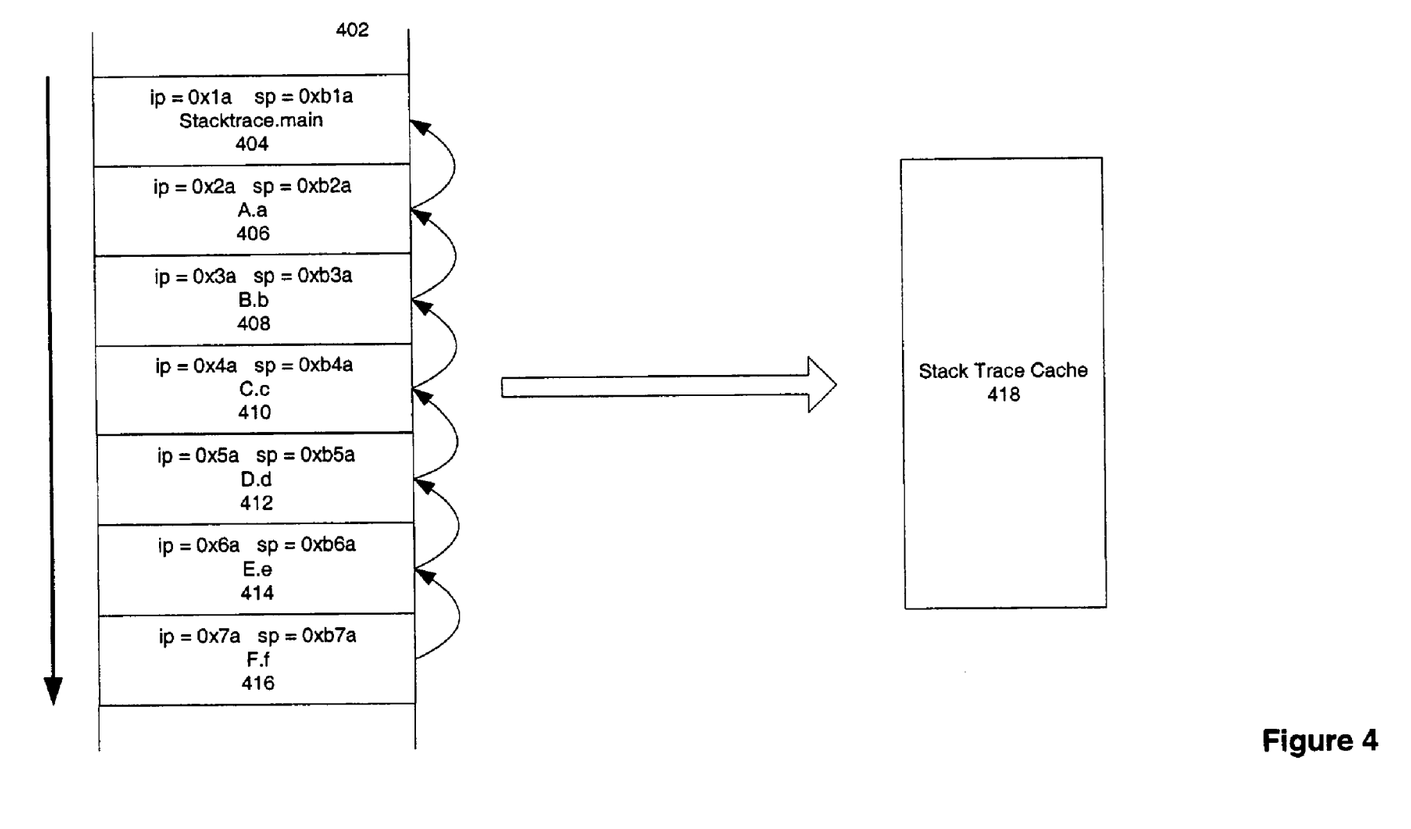
FIG. 4 is a block diagram conceptually illustrating stack trace, according to one embodiment.

FIG. 4 is a block diagram conceptually illustrating stack trace, according to one embodiment. A stack 402 includes a stack of frames 404-416. As illustrated, each of the stack trace frames 404-416 is associated with a flag, "not cached" or "in_cache". Each time a new call is invoked, a stack frame may be generated to hold necessary information for this call, and a Just-In-Time (JIT) compiler may tag it as "not cached". Unwinding, according to one embodiment, continues by continuing the process of proceeding to the next frame of the stack 402, until it reaches Stacktrace.main 404. When a "not cached" frame is reached during unwinding, the frame may be tagged as "in cache". Upon completion of the full unwinding, all frames 404-416 may be tagged as "in cache". Furthermore, all frames 404-416 may have additional or extra stack trace information stored in the stack trace, indexed by pairs of instruction pointers and stack pointers. According to one embodiment, instruction pointers may identify frame information for the stack trace, source location, and the method name, while the stack pointers may differentiate those stack frames with the same instruction pointers; for example, stack frames 412 and 416. Also, for example, instruction pointers may identify frame information for each of the stack frames of the stack frame trace, and stack pointers may separate each of the stack frames using the frame information as identified by the corresponding instruction pointer.

Figure 5:
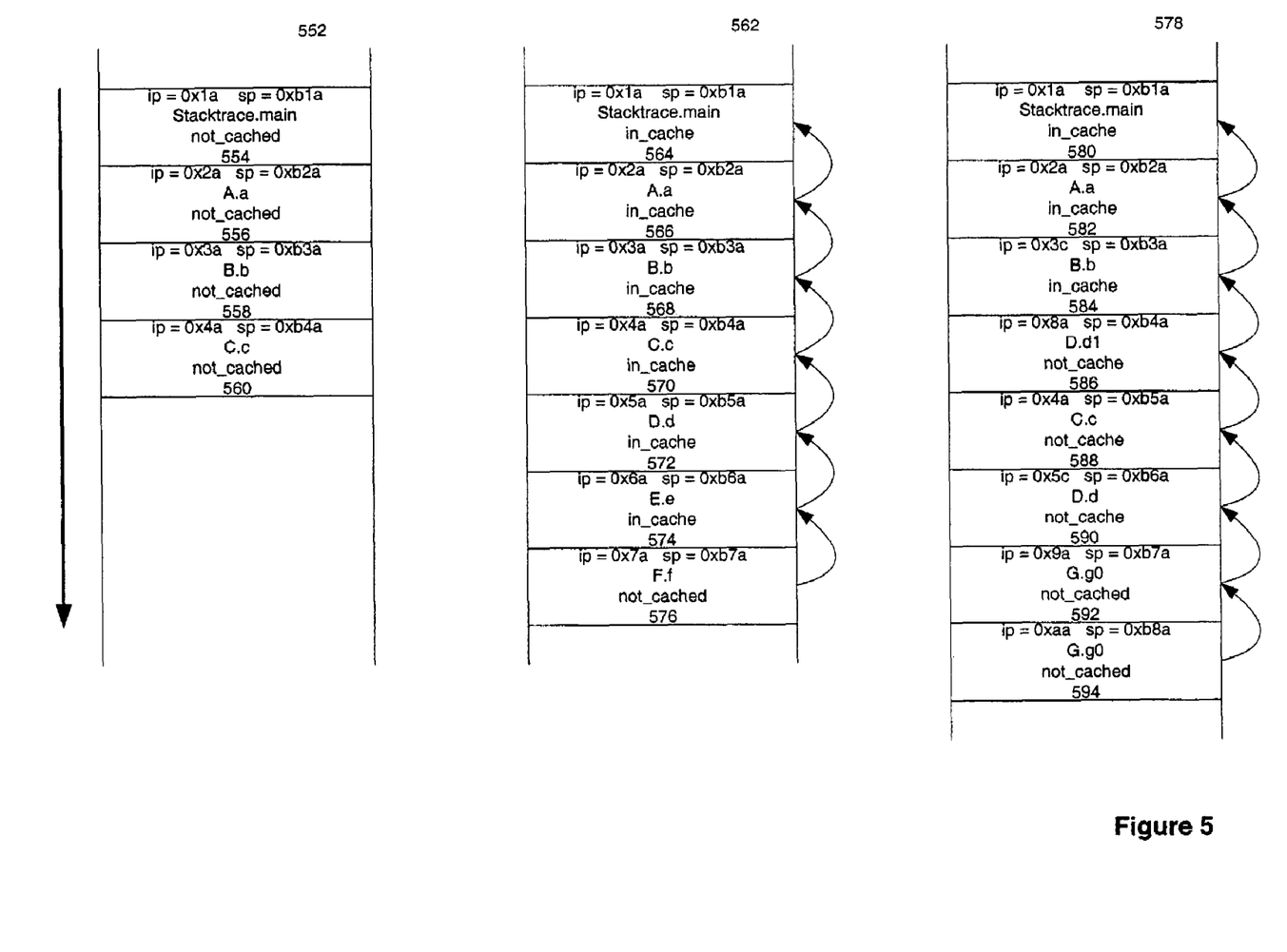
FIG. 5 is a block diagram conceptually illustrating three stack traces and the process of optimized unwinding, according to one embodiment.

FIG. 5 is a block diagram conceptually illustrating three stack traces and the process of optimized unwinding, according to one embodiment. As illustrated, the three stack traces 552, 562, 578 include the first stack trace 552 during execution of a software program, the second stack trace 562 after a first exception stack unwinding, and the third stack trace 578 during the second unwinding, unwind till an "in cache" frame is reached. According to one embodiment, a compiler may tag each of the stack frames 554-560 of the first stack trace 552 as "not cached" during the initial execution of the software program. The first stack trace 552 includes a set of frames 554-560. As illustrated, the first stack trace 552 may include a stack frame 554 for Stacktrace.main, main program, stack frame 556 representing a program A.a called by the main program 554, stack frame 558 representing a program B.b called by program A.a., and stack frame 560 representing program C.c called by program B.b.

According to one embodiment, the second stack trace 562 may include a set of stack frames 564-576. Here, each of the stack frames previously tagged as "not cached" 554-560, as well as other frames, are tagged as "in cache" 564-574 by setting the "in cache" slot to true, during unwinding.

According to one embodiment, the third stack trace 578 may have stack frames 580-594 after second unwinding, until an "in_cache" frame is reached. According to one embodiment, stack unwinding may start from stack frame G.g0 594, tagged as "not cached". Since the G.g0 594 frame is not cached, the slot value may be reset to "in cache" and the process of unwinding may continue to the next frame. Upon reaching stack frame B.b 584, which is already "in cache", the rest of the stack trace information, such as, pairs of instruction pointers and stack pointers, may be retrieved from the stack trace cache without the need for additional unwinding. Furthermore, according to one embodiment, stack unwinding can be made faster by using stack trace information for a first or earlier exception stored in the stack trace cache. According to another embodiment, the "in cache" frames sample may vary in size, including, for example, a relatively larger "in cache" frames sample for additional runtime benefits during unwinding. According to one embodiment, in comparison to the small sample presented here for illustration purposes, a typical sample may have a greater number of "in cache" frames, and so, more runtime benefits during unwinding may be achieved.

According to one embodiment, any combination of the various components and/or steps necessary for certain embodiments of the present invention is contemplated, and may be used based on given circumstances, needs, capabilities, predetermined policy and/or criteria, or such. It is also contemplated that not all the components and/or steps are necessary, and several other components and/or steps may be added, as it will be obvious to the one familiar with the art.

Conventional technologies may be used, together with any desirable modifications that will be apparent to those skilled in the art. For example, the system may include a conventional processor or machine to execute instructions, a conventional memory to store data, conventional encoder to encode data, a conventional transmitter to transmit data, a conventional receiver to receive data, and a conventional decoder to decode data. Certain embodiments of the present invention may involve servers, applications, systems, databases, and various other apparatus and/or software, as desired. For example, various systems may serve and/or have multiple platforms, such as Virtual Address Extension (VAX), Mainframe, personal computer (PC), Active Directory, Novell, Macintosh, UNIX, Linux, etc., as well as standalone machines. While the embodiments of the present invention have been described, those skilled in the art will appreciate various modifications and variations therefrom.

What is claimed is:

1. A method, comprising:
   providing a relationship map to map a key representing a caller-callee relationship with a corresponding value indicating a frequency of call site executions, wherein the frequency of call site executions indicates a number of times a call was executed;
   determining whether a last stack frame of a stack frame trace is cached, wherein stack frames in the stack frame trace represent caller-callee relationships;
   recording a caller-callee relationship if the last stack frame is not cached, wherein the caller-callee relationship is recorded in the relationship map;
   updating the relationship map with the recorded caller-callee relationship;
   monitoring the relationship map via a recompilation scheduler, the monitoring to determine when a compilation or recompilation of callers and callees is to be performed; and
   performing turning on or turning off of dynamic profiling to perform unwinding of the frames in the stack trace.

2. The method of claim 1, further comprising:
   initializing the stack frame trace with a default value;
   tagging the last stack frame that is not cached as cached; and
   unwinding to a next stack frame of the stack frame trace.

3. The method of claim 2, wherein initializing comprises initializing an instruction pointer and a stack frame data structure, the stack frame data structure having a method lookup table.

4. The method of claim 3, wherein the method lookup table comprises
   code addresses corresponding to a caller and a callee of the caller-callee relationship, the code addresses having starting and ending addresses of each method.

5. The method of claim 1, further comprising:
   detecting the next stack frame of the stack frame trace;
   determining whether the next stack frame of the stack frame trace is cached; and
   exiting unwinding if the next stack frame is cached.

6. The method of claim 1, further comprising:
   detecting a bottom stack frame of the stack frame trace; and
   exiting unwinding if the bottom stack frame of the stack frame trace has been reached.

7. The method of claim 1, further comprising upon completion of full unwinding, tagging the stack frames of the stack frame trace as cached.

8. The method of claim 1, wherein the stack frames comprise stack trace information indexed by pairs of instruction pointers and stack pointers.

9. A system, comprising:
   a storage medium; and
   a processor coupled wit the storage medium, the processor to:
      provide a relationship map to map a key representing a caller-callee relationship with a corresponding value indicating a frequency of call site executions, wherein the frequency of call site executions indicates a number of times a call was executed;
      determine whether a last stack frame of a stack frame trace is cached wherein stack frames in the stack frame trace represent caller-callee relationships;
      record a caller-callee relationship if the last stack frame is not cached, wherein the caller-callee relationship is recorded in the relationship map;
      update the relationship map with the recorded caller-callee relationship;
      monitor the relationship map via a recompilation scheduler, the monitoring to determine when a compilation or recompilation of callers and callees is to be performed; and
      perform turning on or turning off of dynamic profiling to perform unwinding of the frames in the stack trace.

10. The system of claim 9, further comprises a compiler, the compiler having one or more of a Java Virtual Machine, a Java Just-In-Time compiler, a Java compiler, and a Java chip.

11. The system of claim 9, wherein the processor is further to provide a recompilation scheduler to check the relationship map to periodically monitor caller-callee pairs.

12. A tangible machine-readable storage medium having instructions which, when executed, cause a machine to:
   provide a relationship map to map a key representing a caller-callee relationship with a corresponding value indicating a frequency of call site executions, wherein the frequency of call site executions indicates a number of times a call was executed;

determine whether a last stack frame of a stack frame trace is cached wherein stack frames in the stack frame trace represent caller-callee relationships;

record a caller-callee relationship if the last stack frame is not cached, wherein the caller-callee relationship is recorded in the relationship map;

update the relationship map with the recorded caller-callee relationship;

monitor the relationship map via a recompilation scheduler, the monitoring to determine when a compilation or recompilation of callers and callees is to be performed; and perform turning on or turning off of dynamic profiling to perform unwinding of the frames in the stack trace.

13. The tangible machine-readable storage medium of claim 12, wherein the instructions when executed, further cause the machine to:

initializing the stack frame trace with a default value;

tagging the last stack frame that is not cached as cached; and unwinding to a next stack frame of the stack frame trace.

14. The tangible machine-readable storage medium of claim 13, wherein initializing comprises initializing an instruction pointer and a stack frame data structure, the stack frame data structure having a method lookup table.

15. The tangible machine-readable storage medium of claim 12, wherein the instructions when executed, further cause the machine to:

detect the next stack frame of the stack frame trace;

determine whether the next frame of The stack frame trace is cached; and exit unwinding if the next stack frame is in cache.

* * * * *